US010826686B1

(12) United States Patent
Cho et al.

(10) Patent No.: US 10,826,686 B1
(45) Date of Patent: Nov. 3, 2020

(54) REUSABLE FUZZY VAULT SYSTEM

(71) Applicant: HRL Laboratories, LLC, Malibu, CA (US)

(72) Inventors: Chongwon Cho, Los Angeles, CA (US); Chong Ding, Sunnyvale, CA (US)

(73) Assignee: HRL Laboratories, LLC, Malibu, CA (US)

( * ) Notice: Subject to any disclaimer, the term of this patent is extended or adjusted under 35 U.S.C. 154(b) by 174 days.

(21) Appl. No.: 16/183,161

(22) Filed: Nov. 7, 2018

Related U.S. Application Data

(60) Provisional application No. 62/583,404, filed on Nov. 8, 2017.

(51) Int. Cl.
 *H04L 9/06* (2006.01)
 *G09C 1/00* (2006.01)

(52) U.S. Cl.
 CPC ............. *H04L 9/0643* (2013.01); *G09C 1/00* (2013.01); *H04L 2209/08* (2013.01)

(58) Field of Classification Search
 CPC .................................................... H04L 9/0643
 See application file for complete search history.

(56) References Cited

U.S. PATENT DOCUMENTS 9,286,454 B2 * 3/2016 Chabanne ............. H04L 9/3231
9,674,184 B2 * 6/2017 Kim ..................... G06F 21/32
2016/0269178 A1 * 9/2016 Yang ..................... H04L 9/3231
2019/0020472 A1 * 1/2019 Cho ........................ H04L 9/002
2020/0145206 A1 * 5/2020 Cho ....................... H04L 9/0618

OTHER PUBLICATIONS

Xavier Boyen. Reusable cryptographic fuzzy extractors. In ACM CCS '04: 11th ACM Conf. on Computer and Communications Security, pp. 82-91. ACM Press, 2004.
Ran Canetti, Benjamin Fuller, Omer Paneth, Leonid Reyzin, and Adam D. Smith. Reusable fuzzy extractors for low-entropy distributions. In Advances in Cryptology—Eurocrypt 2016, Part I, vol. 9665 of LNCS, pp. 117-146. Springer, 2016.
Elwyn R. Berlekamp. Algebraic Coding Theory—Revised Edition. World Scientific Publishing Co., Inc., River Edge, NJ, USA, 2015.

(Continued)

*Primary Examiner* — Ponnoreay Pich
(74) *Attorney, Agent, or Firm* — Tope-McKay & Associates (57) ABSTRACT

Described is a system for biometric based security. The system applies a reusable fuzzy vault (RFV) process to protect secret information. The RFV process comprises a locking algorithm and an unlocking algorithm. The locking algorithm takes as input a fuzzy string m generated from readings of biometrics and secret information sk to be protected, The locking algorithm outputs a public string vault and a hash value h of sk. The unlocking algorithm takes as input a public string vault and a fuzzy string m', and outputs a string sk' if fuzzy string m' is sufficiently close to fuzzy string m. The unlocking algorithm further computes a hash value h' of sk' and compares it with h. The system allows access to the secret information sk when h' is equivalent to h.

18 Claims, 8 Drawing Sheets

(56) References Cited

OTHER PUBLICATIONS

Mihir Bellare and Phillip Rogaway. Random oracles are practical: a paradigm for designing efficient protocols. In Proceedings of the 1st ACM conference on Computer and communications security (CCS '93). ACM, New York, NY, USA, pp. 62-73, 1993.

Daniel Apon, Chongwon Cho, Karim Eldefrawy and Jonathan Katz, Efficient, Reusable Fuzzy Extractors from LWE, In: Dolev S., Lodha S. (eds) Cyber Security Crytography and Machine Learning. CSCML 2017. Lecture Notes in Computer Science, vol. 10332. Springer, Cham, 2017, pp. 1-18.

Charles Herder and Benjamin Fuller and Marten van Dijk and Srinivas Devadas, Public Key Cryptosystem with Noisy Secret Keys, Cryptology ePrint Archive, Report 2017/210, 2017, pp. 1-36.

Irving Reed and Golomb Solomon. Polynomial codes over certain finite fields. Journal of the Society of Industrial and Applied Mathematics, 8(2): pp. 300-304, 1960.

Matthew Franklin and Moti Yung. Communication complexity of secure computation (extended abstract). In Proceedings of the Twenty-fourth Annual ACM Symposium on Theory of Computing, STOC '92, New York, NY, USA, pp. 699-710, 1992.

Adi Shamir. How to share a secret. Communications of the Association for Computing Machinery, 22(11): pp. 612-613, 1979.

\* cited by examiner

REUSABLE FUZZY VAULT SYSTEM

GOVERNMENT LICENSE RIGHTS

This invention was made with government support under U.S. Government Contract Number 2016-16081000009. The government may have certain rights in the invention.

CROSS-REFERENCE TO RELATED APPLICATIONS

This is a Non-Provisional Application of U.S. Provisional Application No. 62/583,404, filed in the United States on Nov. 8, 2017, entitled, "Methods to Use the Same Biometrics to Protect Multiple Private Information: Reusable Fuzzy Vault System," the entirety of which is incorporated herein by reference.

BACKGROUND OF INVENTION

(1) Field of Invention

The present invention relates to a system for protecting secret information, and more particularly, to a system for protecting secret information using a noisy string generated from the readings of biometrics as its secret key such that multiple noisy readings can be used to protect multiple secret information.

(2) Description of Related Art

Fuzzy extractors (FEs) convert biometric data into random strings, which makes it possible to apply cryptographic techniques for biometric security. Fuzzy extractors convert repeated noisy readings of a secret into the same uniformly distributed key. To eliminate noise, an initial enrollment phase takes the first noisy reading of the secret and produces a nonsecret helper string to be used in subsequent readings. Reusable fuzzy extractors (RFEs) remain secure even when this initial enrollment phase is repeated several times with noisy versions of the same secret, producing multiple helper strings.

Reusability security has been considered in the context of fuzzy extractors (see Literature Reference Nos. 1, 2, 5, and 7 of the List of Incorporated Literature References). The only relevant fuzzy vault scheme is Juel and Sudan's first fuzzy vault scheme. However, the fuzzy vault scheme by Juel and Sudan is not secure against adversaries given the multiple vaults locked under the same biometric information.

Thus, a continuing need exists for a RFE which offers improved performance compared to previous works.

SUMMARY OF INVENTION

The present invention relates to a system for protecting secret information, and more particularly, to a system for protecting secret information using a noisy string generated from the readings of biometrics as its secret key such that multiple noisy readings can be used to protect multiple secret information. The system comprises a scanner configured to provide readings of biometrics and one or more processors and a non-transitory computer-readable medium having executable instructions encoded thereon such that when executed, the one or more processors perform multiple operations. The system implements a reusable fuzzy vault (RFV) process to protect secret information sk, wherein the RFV process comprises a locking algorithm and an unlocking algorithm. The locking algorithm takes as input a fuzzy string m generated from readings of biometrics from the scanner and secret information sk to be protected, and wherein the locking algorithm outputs a public string vault and a hash value h of sk. The unlocking algorithm takes as input a public string vault and a fuzzy string m', and outputs a string sk' if fuzzy string m' is sufficiently close to fuzzy string m. The unlocking algorithm further computes a hash value h' of sk' and compares it with h. Access to the secret information sk is allowed when h' is equivalent to h.

In another aspect, the RFV process guarantees that no computationally bounded adversary may obtain the secret information sk given multiple public strings vault locked under multiple readings of the same biometrics.

In another aspect, for a locking algorithm Lock(m, sk) receiving as input a biometric template $m \in \mathbb{F}^{l_m}$ and $sk \in \mathbb{F}^{l_{sk}}$, where $l_m$ denotes a locking key length, $l_{sk}$ denotes a secret random key to be locked, and $\mathbb{F}$ is a finite field, Lock(m,sk) comprises steps of: setting up a public vector $\alpha$ and partitioning the public vector $\alpha$ into a vector of a first $l_m$ elements, a vector of a next $l_{sk}$ elements, and a vector of a last v elements, where v denotes a size of an output reusable vault; sampling a randomizer polynomial of degree $l_m+l_{sk}$; using the randomizer polynomial, computing a polynomial p(x) of degree $2(l_m+l_{sk})$, such that $p(\alpha_m)=m$ and $p(\alpha_{sk})=sk$; computing $p(\alpha_v)=v$; and outputting a pair of vectors ($\alpha$, v), representing a public string vault.

In another aspect, for an unlocking algorithm Unlock (m',($\alpha$, v)), m is a vector of length $l_m$ generated by a reading of biometrics and ($\alpha$, v) is a public string vault, Unlock(m', ($\alpha$, v)) comprises steps of: parsing $\alpha$ into $\alpha_m$, $\alpha_{sk}$ and $\alpha_v$; forming a set of data points ($\alpha_m$, m') and ($\alpha_v$, v); executing a decoding algorithm on the set of data points to obtain a polynomial p(x) of degree less than $2(l_m+l_{sk})$; and computing and outputting sk'=$p(\alpha_{sk})$.

In another aspect, for a locking algorithm Lock(m, sk) receiving as input a biometric template $m \in \mathbb{F}^{l_m}$ and $sk \in \mathbb{F}^{l_{sk}}$, where $l_m$ denotes a locking key length, $l_{sk}$ denotes a secret random key to be locked, and $\mathbb{F}$ is a finite field, Lock(m, sk) comprises steps of: setting a vector of pairwise distinct x-coordinates $\alpha=\{\alpha_1, \alpha_2, \ldots, \alpha_{l_m+l_{sk}+v}\}$, where $\alpha$ is partitioned into three vectors denoted by $\alpha_m$, $\alpha_{sk}$, and $\alpha_v$, such that $\alpha_{sk}$ and $\alpha_v$ are preselected vectors, while $\alpha_m$ is computed as $\alpha_m=H_m$; sampling a random polynomial $r(x) \in F[x]$ of degree $d_r=l_m+l_{sk}$; computing a secret polynomial $p(x) \in F[x]$ of degree $d_p=2d_r$, such that $p(\alpha_m)=m$ and $p(\alpha_{sk})=sk$; computing v=$p(\alpha_v)$; and outputting a reusable vault $V_{sk}^m=(\alpha_{sk}, \alpha_v, v)$.

In another aspect, for an unlocking algorithm Unlock $(V_{sk}^m, m')$ receiving as input a vault $V_{sk}^m=(\alpha_{sk}, \alpha_v, v)$ and a query template $m' \in \mathbb{F}^{l_m}$, Unlock($V_{sk}^m$, m') comprises steps of: computing $\alpha_m=H(m')$;

forming a set of data points ($\alpha_m'$, m') and ($\alpha_v$, v), where Q denotes the set of data points; executing a decoding algorithm on Q to obtain a polynomial p(x) of degree $\leq d_p$; and computing and outputting sk'=$p(\alpha_{sk})$.

Finally, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

The present invention relates to a system for protecting secret information, and more particularly, to a system for protecting secret information using a noisy string generated from the readings of biometrics as its secret key such that multiple noisy readings of the same finger can be used to protect multiple secret information. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of cited references is provided. Next, a description of the various principal aspects of the present invention is provided. Finally, specific details of various embodiment of the present invention are provided to give an understanding of the specific aspects.

(1) List of Incorporated Literature References

The following references are cited and incorporated throughout this application. For clarity and convenience, the references are listed herein as a central resource for the reader. The following references are hereby incorporated by reference as though fully set forth herein. The references are cited in the application by referring to the corresponding literature reference number, as follows:

1. Xavier Boyen. Reusable cryptographic fuzzy extractors. In ACM CCS '04: 11th ACM Conf. on Computer and Communications Security, pages 82-91. ACM Press, 2004.
2. Ran Canetti, Benjamin Fuller, Omer Paneth Leonid Reyzin, and Adam D. Smith. Reusable fuzzy extractors for low-entropy distributions. In Advances in Cryptology—Eurocrypt 2016, Part I, volume 9665 of LNCS, pages 117-146. Springer, 2016.
3. Elwyn R. Berlekamp. Algebraic Coding Theory—Revised Edition. World Scientific Publishing Co., Inc., River Edge, N.J., USA, 2015.
4. Mihir Bellare and Phillip Rogaway. Random oracles are practical: a paradigm for designing efficient protocols. In Proceedings of the 1st ACM conference on Computer and communications security (CCS '93). ACM, New York, N.Y., USA, pages 62-73, 1993.
5. Daniel Apon, Chongwon Cho, Karim Eldefrawy and Jonathan Katz, Efficient, Reusable Fuzzy Extractors from LWE, In: Dolev S., Lodha S. (eds) Cyber Security Cryptography and Machine Learning. CSCML 2017. Lecture Notes in Computer Science, vol 10332. Springer, Cham, 2017.
6. Charles Herder and Benjamin Fuller and Marten van Dijk and Srinivas Devadas, Public Key Cryptosystems with Noisy Secret Keys, Cryptology ePrint Archive, Report 2017/210, 2017.
7. Irving Reed and Golomb Solomon. Polynomial codes over certain finite fields. Journal of the Society of Industrial and Applied Mathematics, 8(2): pages 300-304, 1960.
8. Matthew Franklin and Moti Yung. Communication complexity of secure computation (extended abstract). In Proceedings of the Twenty-fourth Annual ACM Symposium on Theory of Computing, STOC '92, New York, N.Y., USA, pages 699-710, 1992.
9. Adi Shamir. How to share a secret. Communications of the Association for Computing Machinery, 22(11): pages 612-613, 1979.

(2) Principal Aspects

Various embodiments of the invention include three "principal" aspects. The first is a system for protecting secret information. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

Figure 1:
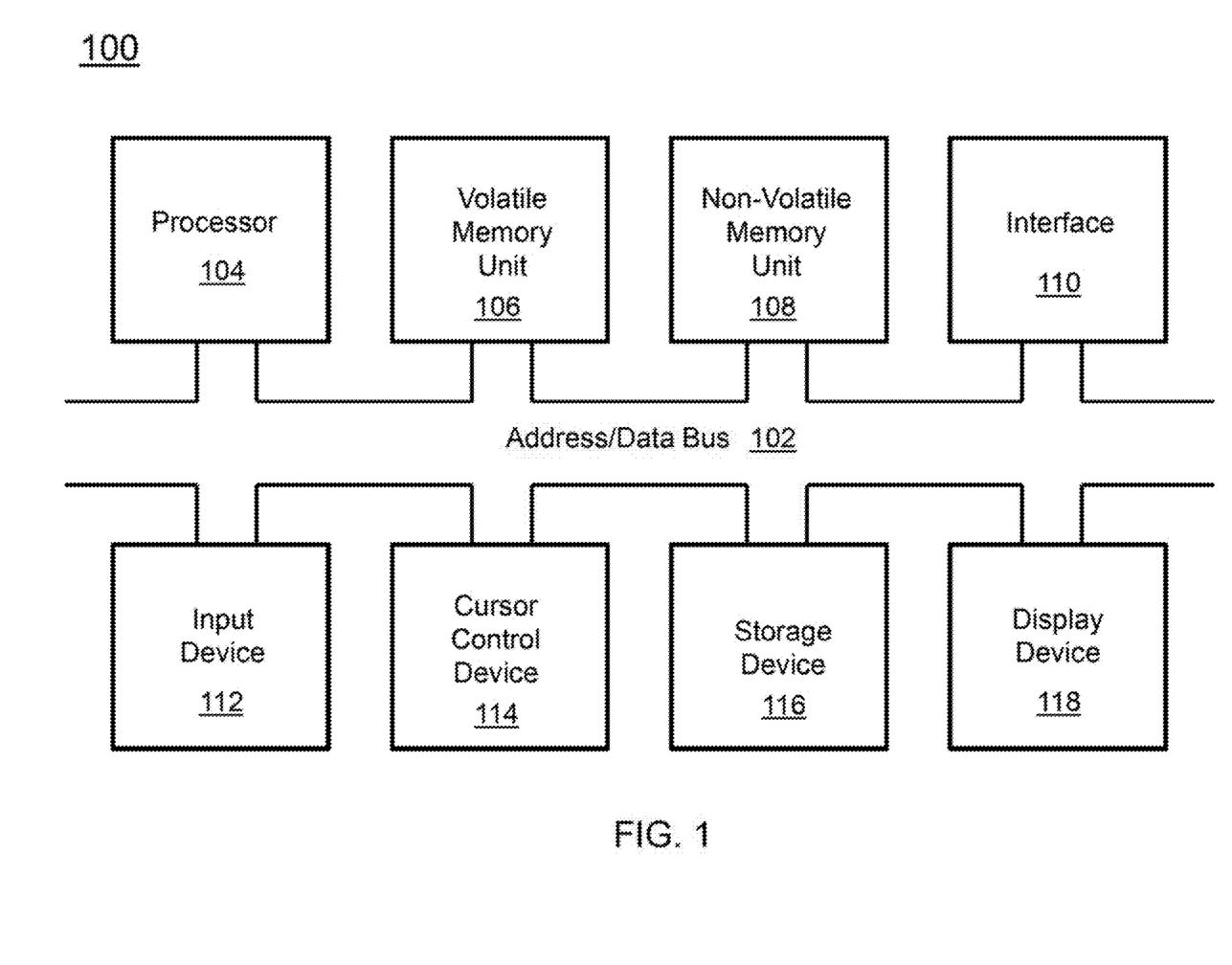
FIG. 1 is a block diagram depicting the components of a system for protecting secret information according to some embodiments of the present disclosure.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA).

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100.

In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
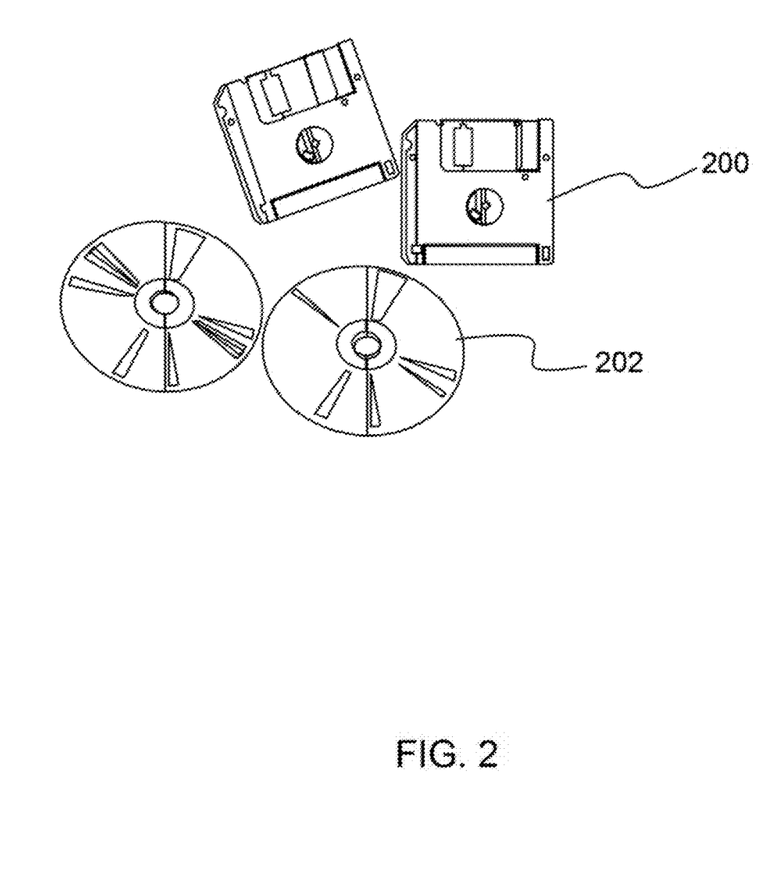
FIG. 2 is an illustration of a computer program product according to some embodiments of the present disclosure.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) Specific Details of Various Embodiments

Described is a method to protect secret information using a noisy string generated from the readings of biometrics as its secret key, such that multiple noisy readings of the same biometric (e.g., fingerprint) can be used to protect multiple pieces of secret information. The method is referred to as a reusable fuzzy vault (RFV). A RFV is a cryptographic system consisting of a pair of algorithms (Lock, Unlock). Lock (also referred to as the Locking algorithm) takes two strings as inputs: a fuzzy string m (called the locking key) generated based on a noisy reading biometrics, and a secret information sk (called a secret) to be protected. The output of Lock is a public string vault. Algorithm Unlock (also referred to as the unlocking algorithm) takes as inputs two strings, a public string vault and a string m' and outputs a string sk' such that sk=sk' if and only if m' is sufficiently close to original m. A similarity metric is used to determine similarity between m and m'. The similarity metric is directly relevant to the authentication security level, which is dependent upon the application domain. For instance, high security will be achieved if two biometric inputs are identical. For example, one agency may require 80% similarity rate to identify a security risk while another agency may require 95% similarity to let an internal member access classified information. The reusability of RFV guarantees that no computationally bounded (polynomial-time) adversary may obtain sk given multiple public strings vault locked under the multiple readings of the same biometrics.

The invention described herein is a RFV system, which bases its reusable security on a computational hardness assumption of Reed-Solomon error correcting code (see Literature Reference No. 5). The RFV system according to embodiments of the present disclosure includes several improvements over existing technologies, including reusable security and compact size of output vault. For example, the RFV system provides a stronger security guarantee, called reusable security. No previously known fuzzy vault method provides reusable security. That is, all existing fuzzy vault schemes are not secure since an adversary can obtain multiple fuzzy vaults locked under biometric keys close to each other. In contrast, the system described herein remains secure even if adversaries obtain multiple vaults locked under the same key. Furthermore, the RFV system has only a constant overhead over the size of the biometric string and secret strings. The only previously known reusable fuzzy vault scheme has the overhead polynomially dependent on size.

(3.1) Settings and Foundational Algorithms

A reusable fuzzy vault consists of two algorithms (Lock, Unlock): Lock and Unlock, denoting locking algorithm and unlocking algorithm, respectively. The syntactic description of these two algorithms is as follows. Lock takes a biometric template m and a secret information sk as inputs and outputs a public string vault. Unlock takes as inputs two strings vault and m', where m' is a query biometric template. Then, Unlock outputs information sk'. The fuzzy correctness of Unlock guarantees that if biometric template m used to create vault is close to the query biometric template m', then it holds that sk=sk'. The reusable security guarantees that one can use the noisy biometric template multiple times to generate multiple public vaults without any leakage of secret information.

Figure 3:
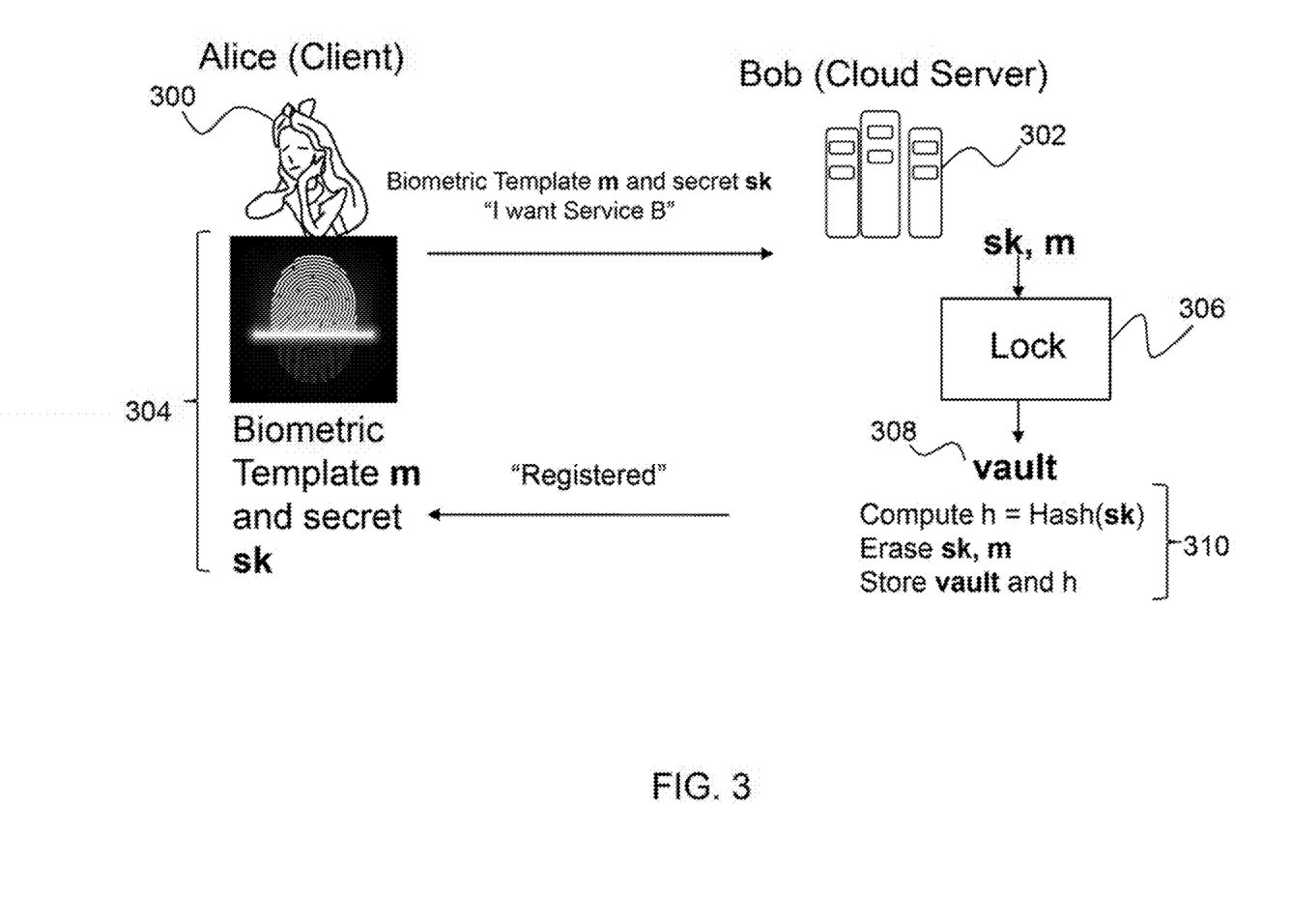
FIG. 3 is an illustration of an identification process based on reusable fuzzy value depicting the registration process using the Lock algorithm according to some embodiments of the present disclosure.

Having the RFV system, a simple biometrics-based identification system can be built. For example, as shown in FIG. 3, consider two parties, Alice (element 300) (client) and Bob (element 302) (server). Alice (element 300) wants to lock a secret information sk by using her biometric template m (e.g., fingerprint) with Bob (element 302) for some secure data storage service B. At the initial registration phase, Alice (element 300) can use a fingerprint scanner provided by Bob (element 302) to obtain and send biometric template m along with a secret information sk (element 304) to Bob (element 302). Then, Bob (element 302) simply runs Lock(sk, m) (element 306) to obtain public helper string vault (element 308). Then, Bob stores a hash value h of sk and vault (element 310). Note that given vault and h (element 310), no information about Alice's (element 300) secret information sk or her biometric data (element 304) is revealed to the adversarial third party even if it completely breaks in the Bob's (element 302) server to obtain vault (element 308).

Figure 4:
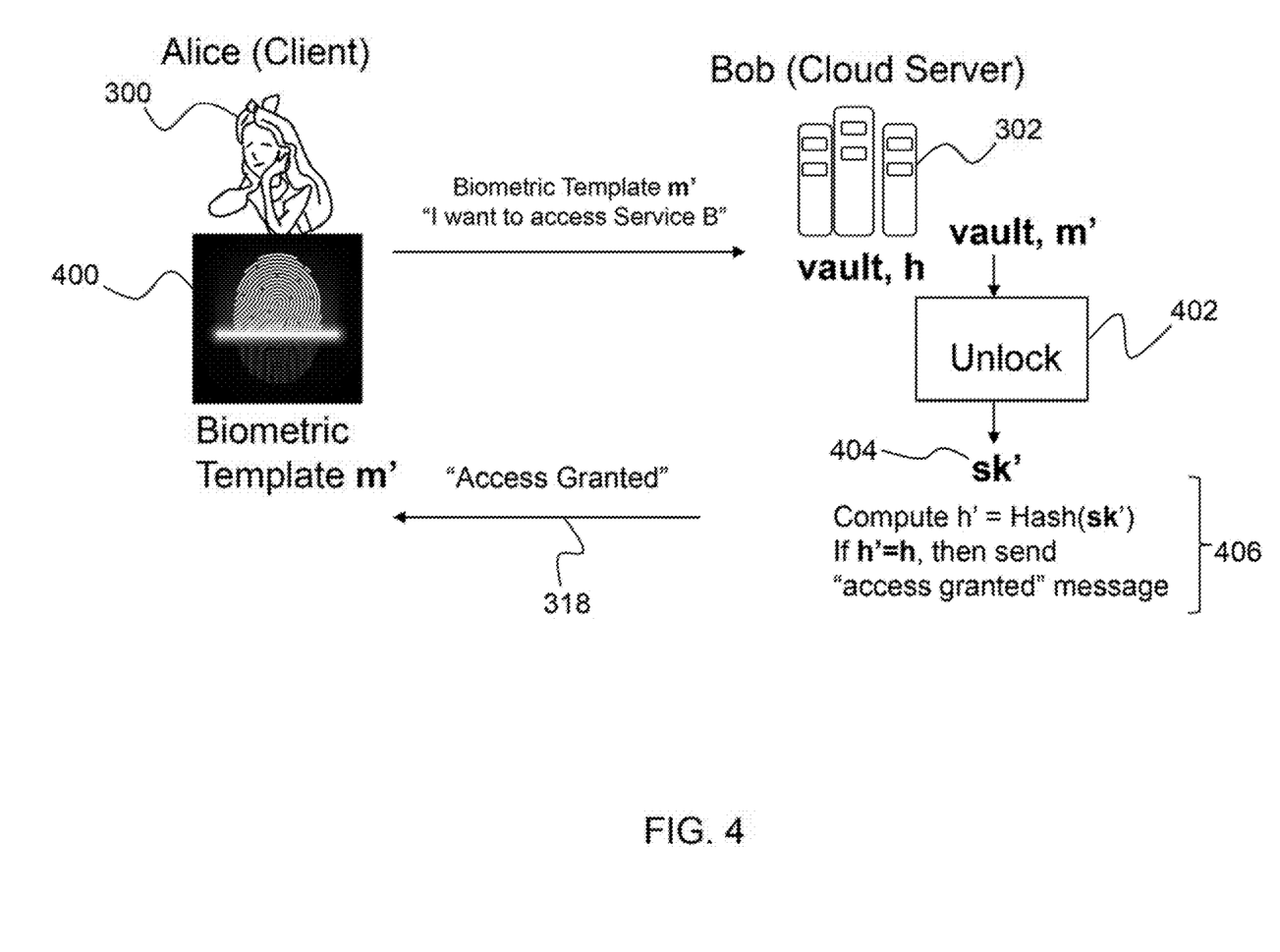
FIG. 4. is an illustration of an identification process based on reusable fuzzy value depicting the identification process using the Unlock algorithm according to some embodiments of the present disclosure.

As depicted in FIG. 4, anytime Alice (element 300) wants to access her cloud storage of Bob (element 302), she scans and sends biometric template m' (element 400) to Bob (element 302). Now Bob (element 302) can execute Unlock (vault, m') (element 402), which outputs the secret information sk' (element 404) created at the point of initial registration. Then, Bob (element 302) computes a hash h' of sk' to compare it with h stored at Bob (element 302). If they match equal, the Bob grants the access to Alice (element 406).

(3.1.1) Technical Preliminaries

First, some algebraic notations and tools to describe the methods of reusable fuzzy vaults are introduced in the following. Generally, standard algebraic notations are used in this disclosure. Denote a set $\{1, 2, \ldots, n\}$ by $[n]$. Let $\mathbb{F}$ be a field of prime order q. Bold lower-case letters are used for vector of field elements. For example, let m be a vector of n field elements in field $\mathbb{F}$. Also, denote the i-th element of vector m by $m[i]$ or $m_i$ for $i \in [n]$. Additionally, let $p(x) \in \mathbb{F}[x]$ be a polynomial of degree d and let m be a vector of length n over $\mathbb{F}$. Then, $p(m)$ is used to denote the vector $(p(m[1]), p(m[2]), \ldots, p(m[n]))$, and for all $i \in [n]$, $p(m)[i] = p(m[i])$.

The Reed-Solomon error-correcting code (RS-code in short) (see Literature Reference No. 7) is an (n,d,t)-linear-error-correcting code C for $d \leq n$, where the set of words is a d-dimensional subspace for n-dimensional vector space which is the set of all codewords, called code C. The RS-code tolerates up tot errors in a codeword such that $t < (n-d)/2$. To encode a message $m \in \mathbb{F}^d$, it sets up a polynomial $p(x) = m_d x^{d-1} + m_d x^{d-2} + \ldots + m_1$ of degree d-1 of which the coefficients are elements of m. Then, the codeword for message m is the vector c defined by $p((1, 2, \ldots, n))$. One advantage of RS-code is that there exists an efficient decoding algorithm which corrects the errors where the number of correctable errors matches the upperbound of correctable errors. One notable decoding algorithm is proposed by Berlekamp (see Literature Reference No. 3). This algorithm is used as a black-box tool in the reusable fuzzy vault methods described herein and is denoted by $BWDecode_{n,d,t}$ that take a vector of length n of d-dimensional space over field $\mathbb{F}$ and corrects errors up to $t < (n-d)/2$.

(3.1.2) Parameters and their Settings

The reusable fuzzy vault is involved with various parameters. Among them, the most crucial parameters are the maximum error tolerance (denoted by t) and the length of (potentially noisy) locking/unlocking key (denoted by $l_m$), all in terms of number of field elements. These two parameters inherent from the underlying biometric data determine the rest of the parameter as follows. The maximum number of random secret strings is denoted by $l_{sk}$ which is set to be $l_m-t$. This is because the desired correctness of the RFV must allow one with some unlocking key m of length $l_m$ potentially including incorrect portions of up to t errors to unlock successfully by reconstructing the secret polynomial. Since the total size of secrets (both sk and m) to be hidden is $l_{sk}+l_m=2l_m-t$, a random polynomial r(x) of degree at least $2l_m-t$ is needed to mask those secret values. Looking ahead, this determines the degree of final secret polynomial p(x) to be (at least) $2(2l_m-t)=4l_m-2t$. Finally, the error correcting property of the BW-algorithm determines the size of output vault denoted by v (e.g., the number of points on the p(x) to be published) to be $3l_m$.

(3.1.3) Reusable Fuzzy Vault for the Edit-Distance Metric

Let $\mathbb{F}$ be a finite field where $|\mathbb{F}|=q$, where q is a prime. Let $l_m$ be the number of field elements of a locking/unlocking key m over. Define a metric distance function $\Delta_{ED}: \mathbb{F}^{l_m} \times \mathbb{F}^{l_m} \to \mathbb{N}^0$ to be an edit distance between two distinct vectors as $\Delta_{ED}(m_1,m_2)$ is the number of positions i such that $m_1[i] \neq m_2[i]$.

(3.1.3.1) Procedure 1

Lock(m,sk): m is a vector of length $l_m$ generated by biometric template and sk is a vector of length $l_{sk}$ over field $\mathbb{F}$ which is a secret information sampled uniformly at random.

Step 1. In this step, set up a public vector α of $l_m+l_{sk}+v$ field elements for x-coordinates. The field elements are only required to be pair-wise distinct. Partition this vector into three parts: the vector of first $l_m$ elements, the vector of next $l_{sk}$ elements and the vector of last v elements, respectively denoted by $\alpha_m$, $\alpha_{sk}$ and $\alpha_v$.

Step 2. In this step, sample a randomizer polynomial r(x) of degree $l_m+l_{sk}$.

Step 3. In this step, use r(x) to compute a polynomial p(x) of degree $2(l_m+l_{sk})$ such that $p(\alpha_m)=m$ and $p(\alpha_{sk})=sk$.

Step 4. In this step, compute $p(\alpha_v)=v$.

Step 5. The final output of method Lock(m,sk) is a pair of vectors (α, v).

(3.1.3.2) Procedure 2

Unlock(m',(α, v)): m is a vector of length $l_m$ generated by biometric template and (α, v) is a public fuzzy vault.

Step 1. In this step, parse α into $\alpha_m$, $\alpha_{sk}$ and $\alpha_v$.

Step 2. In this step, form a set of data points ($\alpha_m$, m') and ($\alpha_v$, v), which is an input to BW-algorithm in Step 3.

Step 3. In this step, execute BWDecode$_{n,d,t}$ algorithm having the data points generated in Step 2 as its input where $n=l_m+l_v$, $d=2(l_m+l_{sk})$, and $t<(n-d)/2$. If nothing returns from the execution, then output "Failed". Otherwise, obtain a polynomial p(x) of degree less than $2(l_m+l_{sk})$.

Step 4. Output sk'=$p(\alpha_{sk})$ as the output of Unlock(m', (α, v)).

Figure 5:
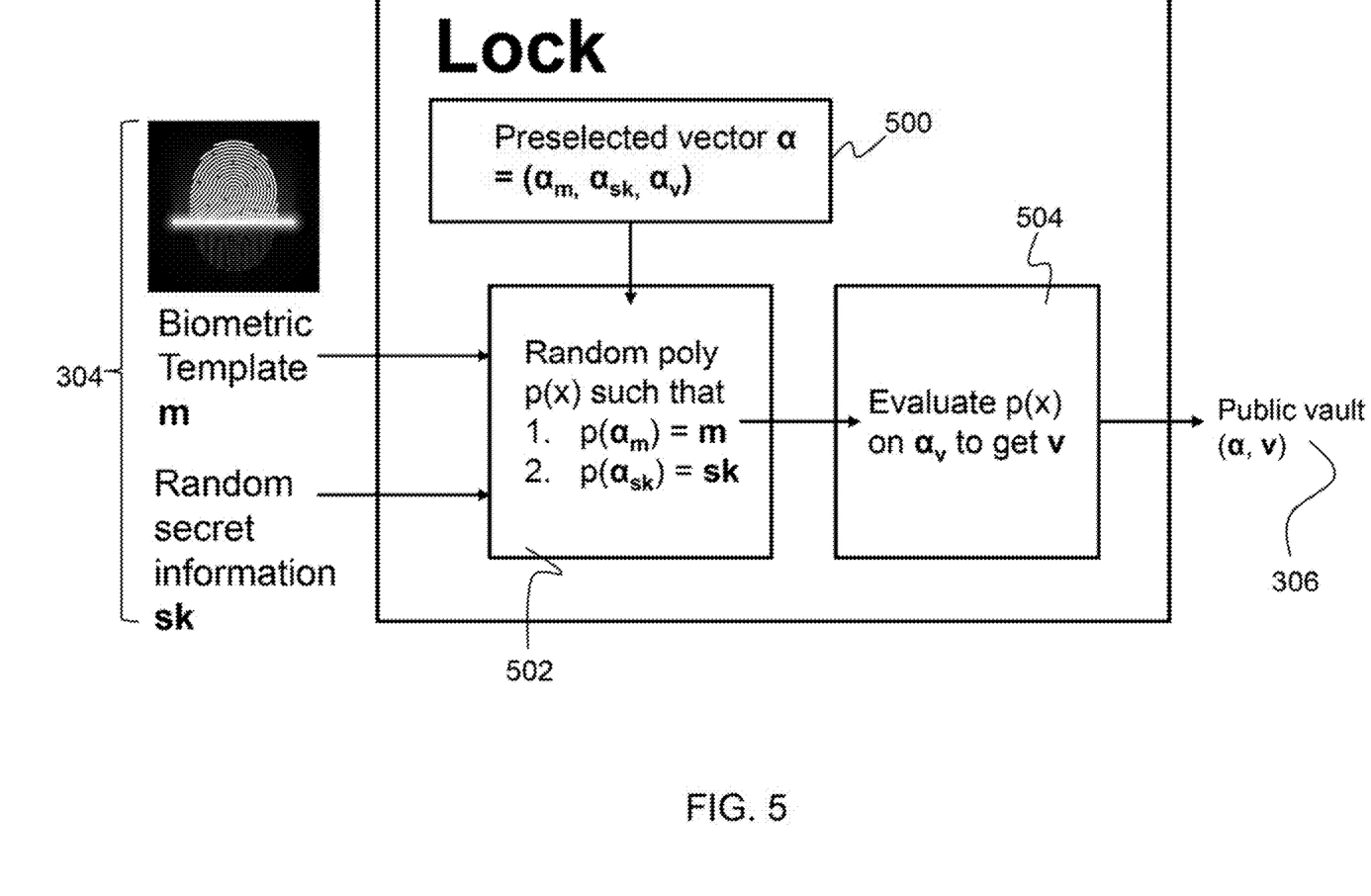
FIG. 5 is an illustration of the Lock method of the reusable fuzzy vault for the edit-distance metric according to some embodiments of the present disclosure.
Figure 6:
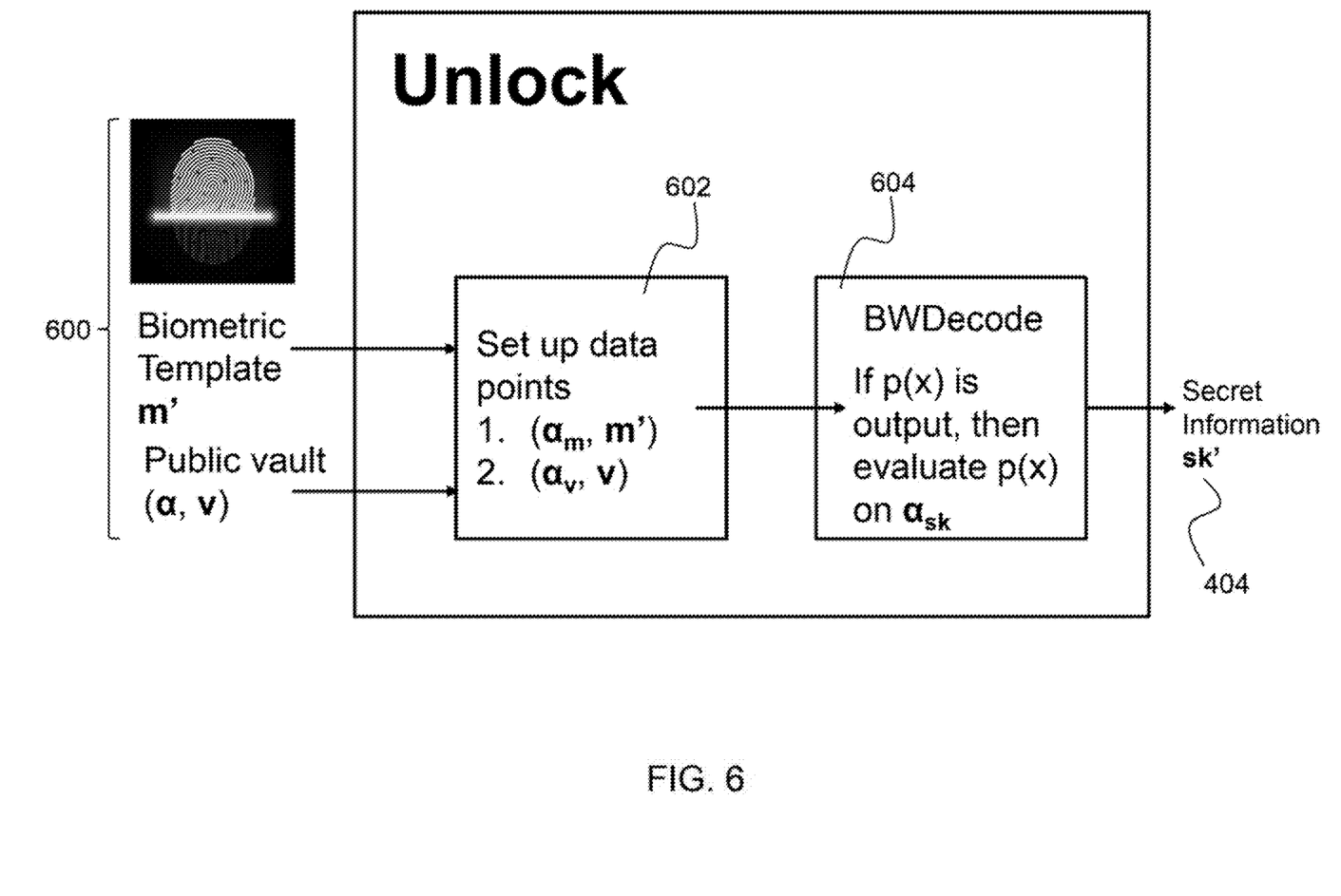
FIG. 6 is an illustration of the Unlock method of the reusable fuzzy vault for the edit-distance metric according to some embodiments of the present disclosure.

FIGS. 5 and 6 depict the reusable fuzzy vault for the edit-distance metric described above, with FIG. 5 showing the method Lock and FIG. 6 showing the method Unlock. The following is a description of reusable fuzzy vault for edit-distance metric according to embodiments of the present disclosure.

Algorithm 1: Reusable Fuzzy Vault Π=(Lock, Unlock)

Basic parameters: (All in the number of field elements)

t=the max number of errors.

$l_m$=locking/unlocking key length.

$l_{sk}$=secret random key to be locked=$l_m-t$.

$d_r$=the degree of randomizer polynomial.

$d_p$=the degree of final secret polynomial.

v=the size or maximum number of characters in the biggest string that can be stored in the reusable vault.

procedure: Lock (m, sk) (FIG. 5)

input: A biometric template $m \in \mathbb{F}^{l_m}$ and $sk \in \mathbb{F}^{l_{sk}}$. (element 304). The biometric template is the output of the machine that reads the fingerprint or the eye scanner that reads the retina.

output: Fuzzy vault $V_{sk}^m \in \mathbb{F}^v$. (element 306)

1. (Public x-coordinates) Set $\alpha=\{\alpha_1, \alpha_2, \ldots, \alpha_{l_m+l_{sk}+v}\}$. Partition α into three vectors denoted by $\alpha_m$, $\alpha_{sk}$, and $\alpha_v$. (element 500) $\alpha_m$ is the vector containing the first $l_m$ entries of α. $\alpha_{sk}$ is the vector containing the next $l_{sk}$ entries of α. Finally, $\alpha_v$ is the vector containing the rest v entries of α.

2. (Randomizer of polynomial of degree $d_r$) Sample a random polynomial $r(x) \in F[x]$ of degree $d_r=+l_{sk}$. (element 502)

3. (Secret polynomial of degree $d_p$) Compute a secret polynomial $p(x) \in F[x]$ of degree $d_p=2d_r$ such that $p(\alpha_m)=m$ and $p(\alpha_{sk})=sk$ as follows:

$$p(x) = r(x) \cdot \prod_{i=1}^{l_m+l_{sk}} (x-\alpha_i) + \sum_{i=1}^{l_m} m[i] \cdot L_i(x) + \sum_{i=l_m+1}^{l_m+l_{sk}} sk[i-l_m] \cdot L_i(x),$$

where $L_i(x)$ is the degree-$(l_m+l_{sk}-1)$ Lagrange polynomial $$\frac{\prod_{j \neq i}(x-\alpha_j)}{\prod_{j \neq i}(\alpha_i-\alpha_j)} \text{ for } \alpha_m \| \alpha_{sk} = \{\alpha_1, \ldots, \alpha_{l_m+l_{sk}}\}.$$

4. (Evaluation of public points) Compute $v=p(\alpha_v)$. (element 504)

5. Output the reusable vault $V_{sk}^m=(\alpha, v)$. (element 306)

procedure Unlock($V_{sk}^m$, m) (FIG. 6)

input: A vault $V_{sk}^m=(\alpha v)$ and a query template $m' \in \mathbb{F}^{l_m}$. (element 600)

output: The secret vector $sk \in \mathbb{F}^{l_{sk}}$ only if $\Delta_{ED}(m, m') \leq t$. (element 404)

1. Parse α into $\alpha_m$, $\alpha_{sk}$, $\alpha_v$.

2. Form $l_m+l_{sk}$ points ($\alpha_m$, m') and ($\alpha_v$, v). Let Q be the set of these points. (element 602)

3. Execute BWDecode$_{l_m+l_v, d_p, t}$(Q) which outputs p(x) of degree $\leq d_p$ such that p(x) is consistent with at least $l_m+l_v-t$ points, if any exists. (element 604) If a polynomial p(x) is output, then proceed to the next step. Otherwise, halt by output "Failed".

4. Compute and output sk'=$p(\alpha_{sk})$. (element 404)

(3.1.4) Reusable Fuzzy Vault for the Set-Difference Metric

The only difference between the reusable fuzzy vault for the edit-distance metric (FIGS. 5 and 6) and the reusable fuzzy vault for the set-difference metric (described below) is that $\alpha_m=H(m)$ in the set-difference metric, where H is a cryptographic hash function. The security holds when no collision occurs. Thus, $q=2^{\omega(\log l_m)}$ is needed.

Let $\mathbb{F}$ be a finite field where $|\mathbb{F}|=q$, where q has the size described above. Let $l_m$ be the number of field elements of a locking/unlocking key m over $\mathbb{F}$. Let H: $\mathbb{F} \to \mathbb{F}$ be a random oracle. Define a metric distance function $\Delta_{SD}$: $\mathbb{F}^{l_m} \times \mathbb{F}^{l_m} \to \mathbb{N}^0$ to be a set difference between two distinct sets as $\Delta_{SD}(m_1,m_2)$ is $|m_1 \backslash m_2|$. The following is a description of a reusable fuzzy vault for the set-difference metric (depicted in FIGS. 7 and 8) according to embodiments of the present disclosure. Again, the only difference is the use of hash and how large q is.

Figure 7:
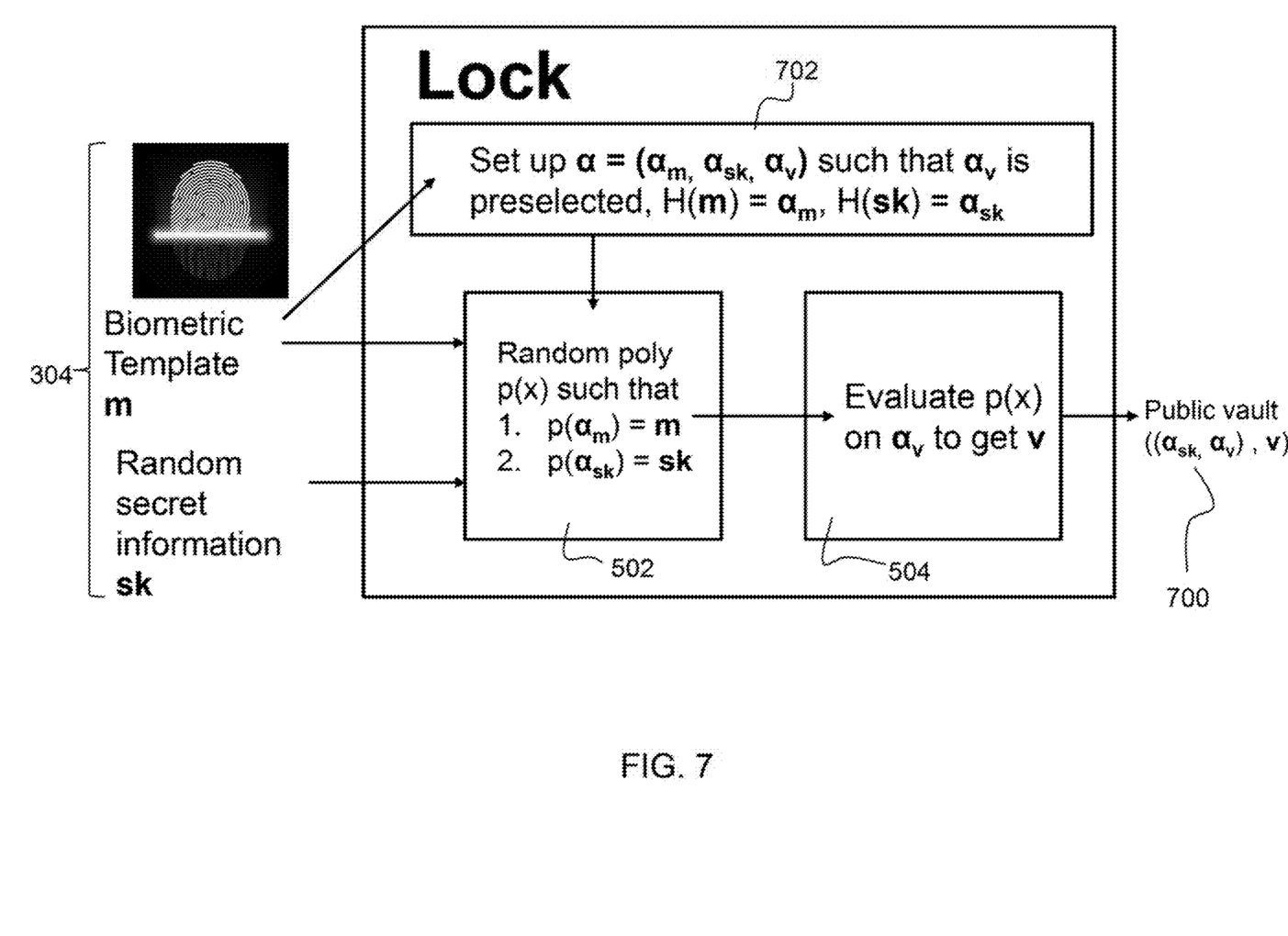
FIG. 7 is an illustration of the Lock method of the reusable fuzzy vault for the set-distance metric according to some embodiments of the present disclosure.
Figure 8:
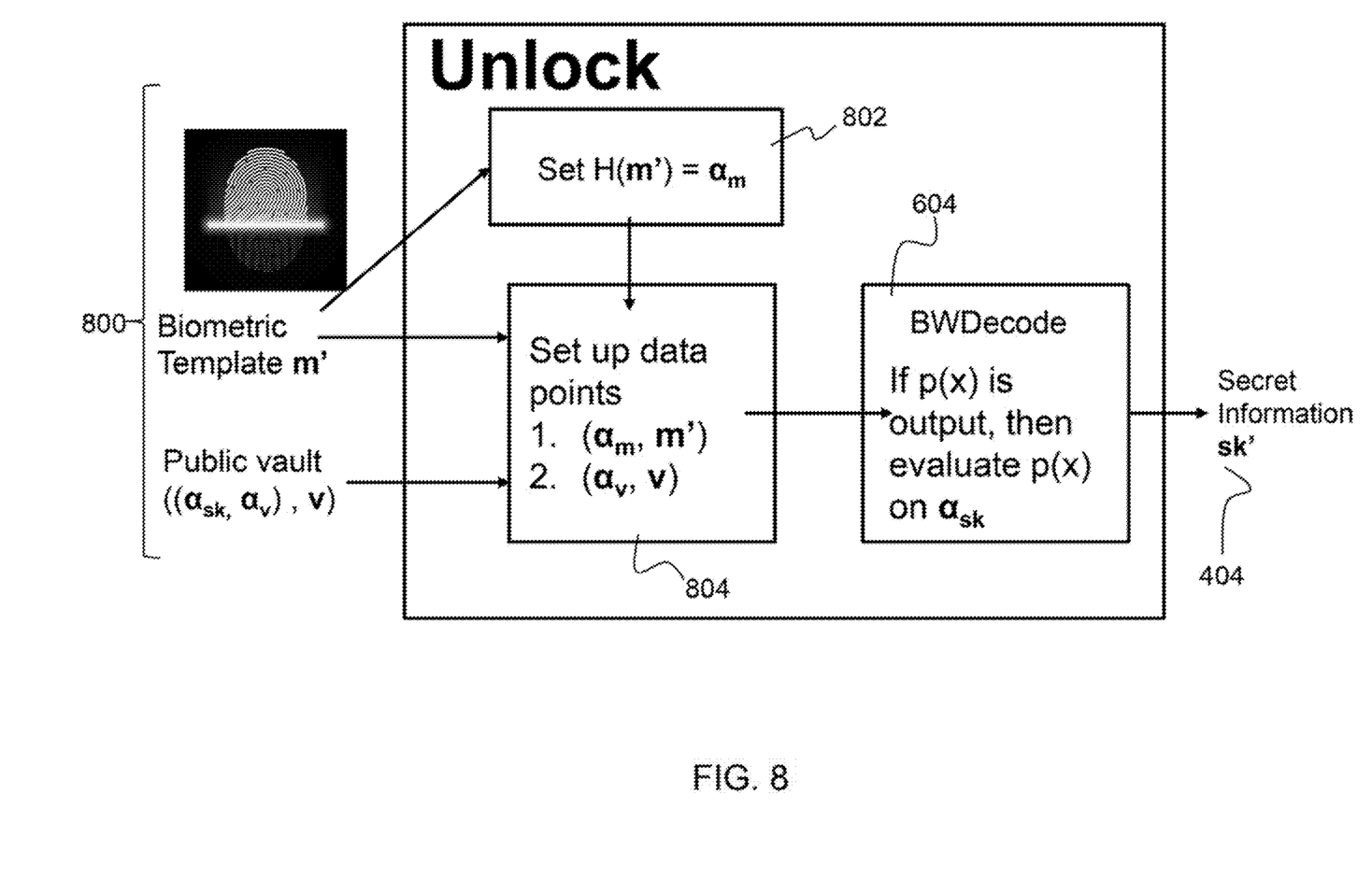
FIG. 8 is an illustration of the Unlock method of the reusable fuzzy vault for the set-distance metric according to some embodiments of the present disclosure.

Algorithm 2: Reusable Fuzzy Vault $\Pi_{sd}$=(Lock, Unlock)
  Basic parameters: (All in the number of field elements)
    t=the max number of errors.
    $l_m$=locking/unlocking key length.
    $l_{sk}$=secret random key to be locked=$l_m$−t.
    $d_r$=the degree of randomizer polynomial.
    $d_p$=the degree of final secret polynomial.
    v=the size of the output reusable vault.
    q=the order of $\mathbb{F}$ such that q=$2^{\omega(\log l_m)}$
  procedure: Lock (m, sk) (FIG. 7)
  input: A biometric template m∈$\mathbb{F}^{l_m}$ and sk∈$\mathbb{F}^{l_{sk}}$. (element 304)
  output: Fuzzy vault $V_{sk}^m$=($\alpha_{sk}$, $\alpha_v$, v). (element 700)
  1. (Public x-coordinates) Set a vector of pairwise distinct x-coordinates $\alpha$={$\alpha_1, \alpha_2, \ldots, \alpha_{l_m+l_{sk}+v}$}, where $\alpha$ is partitioned into three vectors denoted by $\alpha_m$, $\alpha_{sk}$, and $\alpha_v$ identically to the first step of Algorithm 1 such that $\alpha_{sk}$ and $\alpha_v$ can be preselected vectors, while $\alpha_m$ is computed as $\alpha_m$=$H_m$, which means $\alpha_m[i]$=H(m[i]) for all i∈[$l_m$]. (element 702)
  2. (Randomizer of polynomial of degree $d_r$.) Sample a random polynomial r(x)∈F[x] of degree $d_r$=+$l_{sk}$. (element 502)
  3. (Secret polynomial of degree $d_p$) Compute a secret polynomial p(x)∈F[x] of degree $d_p$=2$d_r$ such that p($\alpha_m$)=m and p($\alpha_{sk}$)=sk as follows:

$$p(x) = r(x) \cdot \prod_{i=1}^{l_m+l_{sk}} (x-\alpha_i) + \sum_{i=1}^{l_m} m[i] \cdot L_i(x) + \sum_{i=l_m+1}^{l_m+l_{sk}} sk[i-l_m] \cdot L_i(x),$$

where $L_i(x)$ is the degree-($l_m$+$l_{sk}$−1). Lagrange polynomial $$\frac{\prod_{j \neq i}(x-\alpha_j)}{\prod_{j \neq i}(\alpha_i - \alpha_j)} \text{ for } \alpha_m || \alpha_{sk} = \{\alpha_1, \ldots, \alpha_{l_m+l_{sk}}\}.$$

4. (Evaluation of public points) Compute v=p($\alpha_v$). (element 504)
  5. Output the reusable vault $V_{sk}^m$=($\alpha_{sk}$, $\alpha_v$, v). (element 700)
  procedure Unlock($V_{sk}^m$, m') (FIG. 8)
  input: A vault $V_{sk}^m$=($\alpha_{sk}$, $\alpha_v$, v) and a query template m'∈ $\mathbb{F}^{l_m}$. (element 800)
  output: The secret vector sk∈$\mathbb{F}^{l_{sk}}$ only if $\Delta_{ED}$(m,m')≤t. (element 404)
  1. Compute $\alpha_{m'}$=H(m'). (element 802)
  2. Form $l_m$+$l_{sk}$ points ($\alpha_{m'}$, m') and ($\alpha_v$, v). Let Q be the set of these points. (element 804)
  3. Execute BWDecode$_{l_m+l_v,d_p,t}$(Q) which outputs p(x) of degree ≤$d_p$ such that p(x) is consistent with at least $l_m$+$l_v$−t points, if any exists. (element 604) If a polynomial p(x) is output, then proceed to the next step. Otherwise, halt by output "Failed".
  4. Compute and output sk'=p($\alpha_{sk}$). (element 404)

The invention described herein can be used as a biometric-based authentication system or a knowledge proof system of identification which might be a subsystem for other cryptosystems that can utilize noisy biometric information as a cryptographic key. For example, with reference to FIG. 3, a biometric-based authentication system used by a user Alice and a server Bob can be built as follows. When Alice wants to lock a secret credential sk with her fingerprint m at the server Bob, the server Bob runs Lock(sk, m) and obtains a public string vault and a hash value h of sk. Bob stores only the public string vault, h, and nothing else. Later, with reference to FIG. 4, Alice may want to access the database of server Bob. Then, Bob can authenticate the Alice's credential as it reads Alice's fingerprint m' and runs Unlock (vault, m') to obtain sk'. Note that m' might be a noisy version of original fingerprint m but the two readings are close enough so that sk'=sk. Finally, Bob computes the hash value h' of sk' and compares it with h. Access is granted when h=h'.

The system according to embodiments of this disclosure is a reusable fuzzy vault. The reusability security has been only considered in the context of fuzzy extractors, as described in Literature Reference Nos. 1, 2, 5, and 7.

As can be appreciated by one skilled in the art, the system may comprise a fingerprint scanner or eye scanner (e.g., iris scanner, retinal scanner) for obtaining the biometric data. A fingerprint scanner is hardware that uses fingerprints for biometric authentication to verify and authenticate identity. Iris scanning biometrics measure unique patterns in the colored circle of an eye to verify and authenticate identity. Iris-based identification requires specific hardware to be used, such as an iris scanner. A retinal scanner uses unique patterns on a person's retina blood vessels for authentication.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A system implementing biometric based security, the system comprising:
  a scanner configured to provide readings of biometrics; and
  one or more processors and a non-transitory computer-readable medium having executable instructions encoded thereon such that when executed, the one or more processors perform an operation of:
  applying a reusable fuzzy vault (RFV) process to protect secret information sk, wherein the RFV process comprises a locking algorithm and an unlocking algorithm, wherein the locking algorithm takes as input a fuzzy string m generated from readings of biometrics from the scanner and secret information sk to be protected, and wherein the locking algorithm outputs a public string vault and a hash value h of sk;

wherein the unlocking algorithm takes as input a public string vault and a fuzzy string m', and outputs a string sk' if fuzzy string m' is sufficiently close to fuzzy string m, wherein the unlocking algorithm further computes a hash value h' of sk' and compares it with h; and allowing access to the secret information sk when h' is equivalent to h.

2. The system as set forth in claim 1, wherein the RFV process guarantees that no computationally bounded adversary may obtain the secret information sk given multiple public strings vault locked under multiple readings of the same biometrics.

3. The system as set forth in claim 1, wherein for a locking algorithm Lock(m, sk) receiving as input a biometric template $m \in \mathbb{F}^{l_m}$ and $sk \in \mathbb{F}^{l_{sk}}$, where $l_m$ denotes a locking key length, $l_{sk}$ denotes a secret random key to be locked, and $\mathbb{F}$ is a finite field, Lock(m,sk) comprises steps of:

setting up a public vector $\alpha$ and partitioning the public vector $\alpha$ into a vector of a first $l_m$ elements, a vector of a next $l_{sk}$ elements, and a vector of a last v elements, where v denotes a size of an output reusable vault;

sampling a randomizer polynomial of degree $l_m+l_{sk}$;

using the randomizer polynomial, computing a polynomial p(x) of degree $2(l_m+l_{sk})$, such that $p(\alpha_m)=m$ and $p(\alpha_{sk})=sk$;

computing $p(\alpha_v)=v$; and outputting a pair of vectors ($\alpha$, v), representing a public string vault.

4. The system as set forth in claim 3, wherein for an unlocking algorithm Unlock (m',($\alpha$, v)), m is a vector of length $l_m$ generated by a reading of biometrics and ($\alpha$, v) is a public string vault, Unlock(m',($\alpha$, v)) comprises steps of:

parsing $\alpha$ into $\alpha_m$, $\alpha_{sk}$ and $\alpha_v$;

forming a set of data points ($\alpha_m$, m') and ($\alpha_v$, v);

executing a decoding algorithm on the set of data points to obtain a polynomial p(x) of degree less than $2(l_m+l_{sk})$; and computing and outputting $sk'=p(\alpha_{sk})$.

5. The system as set forth in claim 1, wherein for a locking algorithm Lock(m, sk) receiving as input a biometric template $m \in \mathbb{F}^{l_m}$ and $sk \in \mathbb{F}^{l_{sk}}$, where $l_m$ denotes a locking key length, $l_{sk}$ denotes a secret random key to be locked, and $\mathbb{F}$ is a finite field, Lock(m, sk) comprises steps of:

setting a vector of pairwise distinct x-coordinates $\alpha=\{\alpha_1, \alpha_2, \ldots, \alpha_{l_m+l_{sk}+v}\}$, where $\alpha$ is partitioned into three vectors denoted by $\alpha_m$, $\alpha_{sk}$, and $\alpha_v$, such that $\alpha_{sk}$ and $\alpha_v$ are preselected vectors, while $\alpha_m$ is computed as $\alpha_m=H_m$;

sampling a random polynomial $r(x) \in F[x]$ of degree $d_r=l_m+l_{sk}$;

computing a secret polynomial $p(x) \in F[x]$ of degree $d_p=2d_r$, such that $p(\alpha_m)=m$ and $p(\alpha_{sk})=sk$;

computing $v=p(\alpha_v)$; and outputting a reusable vault $V_{sk}^m=(\alpha_{sk}, \alpha_v, v)$.

6. The system as set forth in claim 5, wherein for an unlocking algorithm Unlock($V_{sk}^m$, m') receiving as input a vault $V_{sk}^m=(\alpha_{sk}, \alpha_v, v)$ and a query template $m' \in \mathbb{F} \mathbb{F}^{l_m}$, Unlock($V_{sk}^m$, m') comprises steps of:

computing $\alpha_m=H(m')$;

forming a set of data points ($\alpha_m$, m') and ($\alpha_v$, v), where Q denotes the set of data points;

executing a decoding algorithm on Q to obtain a polynomial p(x) of degree $\leq d_p$; and computing and outputting $sk'=p(\alpha_{sk})$.

7. A computer implemented method for biometric based security, the method comprising an act of:

causing one or more processors to execute instructions encoded on a non-transitory computer-readable medium, such that upon execution, the one or more processors perform operations of:

applying a reusable fuzzy vault (RFV) process to protect secret information sk, wherein the RFV process comprises a locking algorithm and an unlocking algorithm, wherein the locking algorithm takes as input a fuzzy string m generated from readings of biometrics and secret information sk to be protected, and wherein the locking algorithm outputs a public string vault and a hash value h of sk;

wherein the unlocking algorithm takes as input a public string vault and a fuzzy string m', and outputs a string sk' if fuzzy string m' is sufficiently close to fuzzy string m, wherein the unlocking algorithm further computes a hash value h' of sk' and compares it with h; and allowing access to the secret information sk when h' is equivalent to h.

8. The method as set forth in claim 7, wherein the RFV process guarantees that no computationally bounded adversary may obtain the secret information sk given multiple public strings vault locked under multiple readings of the same biometrics.

9. The method as set forth in claim 7, wherein for a locking algorithm Lock(m, sk) receiving as input a biometric template m? $\mathbb{F}^{l_m}$ and $sk \in \mathbb{F}^{l_{sk}}$, where $l_m$ denotes a locking key length, $l_{sk}$ denotes a secret random key to be locked, and $\mathbb{F}$ is a finite field, Lock(m,sk) comprises steps of:

setting up a public vector $\alpha$ and partitioning the public vector $\alpha$ into a vector of a first $l_m$ elements, a vector of a next $l_{sk}$ elements, and a vector of a last v elements, where v denotes a size of an output reusable vault;

sampling a randomizer polynomial of degree $l_m+l_{sk}$;

using the randomizer polynomial, computing a polynomial p(x) of degree $2(l_m+l_{sk})$, such that $p(\alpha_m)=m$ and $p(\alpha_{sk})=sk$;

computing $p(\alpha_v)=v$; and outputting a pair of vectors ($\alpha$, v), representing a public string vault.

10. The method as set forth in claim 9, wherein for an unlocking algorithm Unlock (m',($\alpha$, v)), m is a vector of length $l_m$ generated by a reading of biometrics and ($\alpha$, v) is a public string vault, Unlock(m',($\alpha$, v)) comprises steps of:

parsing $\alpha$ into $\alpha_m$, $\alpha_{sk}$ and $\alpha_v$;

forming a set of data points ($\alpha_m$, m') and ($\alpha_v$, v);

executing a decoding algorithm on the set of data points to obtain a polynomial p(x) of degree less than $2(l_m+l_{sk})$; and computing and outputting $sk'=p(\alpha_{sk})$.

11. The method as set forth in claim 7, wherein for a locking algorithm Lock(m, sk) receiving as input a biometric template $m \in \mathbb{F}^{l_m}$ and $sk \in \mathbb{F}^{l_{sk}}$, where $l_m$ denotes a locking key length, $l_{sk}$ denotes a secret random key to be locked, and $\mathbb{F}$ is a finite field, Lock(m, sk) comprises steps of:

setting a vector of pairwise distinct x-coordinates $\alpha=\{\alpha_1, \alpha_2, \ldots, \alpha_{l_m+l_{sk}+v}\}$, where $\alpha$ is partitioned into three vectors denoted by $\alpha_m$, $\alpha_{sk}$, and $\alpha_v$, such that $\alpha_{sk}$ and $\alpha_v$ are preselected vectors, while $\alpha_m$ is computed as $\alpha_m=H_m$;

sampling a random polynomial $r(x) \in F[x]$ of degree $d_r=l_m+l_{sk}$;

computing a secret polynomial $p(x) \in F[x]$ of degree $d_p=2d_r$, such that $p(\alpha_m)=m$ and $p(\alpha_{sk})=sk$;

computing $v=p(\alpha_v)$; and outputting a reusable vault $V_{sk}^m=(\alpha_{sk}, \alpha_v, v)$.

12. The method as set forth in claim 11, wherein for an unlocking algorithm Unlock($V_{sk}^m$, m') receiving as input a vault $V_{sk}^m=(\alpha_{sk}, \alpha_v, v)$ and a query template $m' \in F^{l_m}$, Unlock($V_{sk}^m$, m') comprises steps of:

computing $\alpha_{m'}=H(m')$;

forming a set of data points $(\alpha_{m'}, m')$ and $(\alpha_v, v)$, where Q denotes the set of data points;

executing a decoding algorithm on Q to obtain a polynomial $p(x)$ of degree $\leq d_p$; and computing and outputting $sk'=p(\alpha_{sk})$.

13. A computer program product implementing biometric based security, the computer program product comprising:

computer-readable instructions stored on a non-transitory computer-readable medium that are executable by a computer having one or more processors for causing the processor to perform operations of:

applying a reusable fuzzy vault (RFV) process to protect secret information sk, wherein the RFV process comprises a locking algorithm and an unlocking algorithm, wherein the locking algorithm takes as input a fuzzy string m generated from readings of biometrics and secret information sk to be protected, and wherein the locking algorithm outputs a public string vault and a hash value h of sk;

wherein the unlocking algorithm takes as input a public string vault and a fuzzy string m', and outputs a string sk' if fuzzy string m' is sufficiently close to fuzzy string m, wherein the unlocking algorithm further computes a hash value h' of sk' and compares it with h; and allowing access to the secret information sk when h' is equivalent to h.

14. The computer program product as set forth in claim 13, wherein the RFV process guarantees that no computationally bounded adversary may obtain the secret information sk given multiple public strings vault locked under multiple readings of the same biometrics.

15. The computer program product as set forth in claim 13, wherein for a locking algorithm Lock(m, sk) receiving as input a biometric template $m \in F^{l_m}$ and $sk \in F^{l_{sk}}$, where $l_m$ denotes a locking key length, $l_{sk}$ denotes a secret random key to be locked, and $F$ is a finite field, Lock(m,sk) comprises steps of:

setting up a public vector $\alpha$ and partitioning the public vector $\alpha$ into a vector of a first $l_m$ elements, a vector of a next $l_{sk}$ elements, and a vector of a last v elements, where v denotes a size of an output reusable vault;

sampling a randomizer polynomial of degree $l_m+l_{sk}$;

using the randomizer polynomial, computing a polynomial $p(x)$ of degree $2(l_m+l_{sk})$, such that $p(\alpha_m)=m$ and $p(\alpha_{sk})=sk$;

computing $p(\alpha_v)=v$; and outputting a pair of vectors $(\alpha, v)$, representing a public string vault.

16. The computer program product as set forth in claim 15, wherein for an unlocking algorithm Unlock (m',($\alpha$, v)), m is a vector of length $l_m$ generated by a reading of biometrics and ($\alpha$, v) is a public string vault, Unlock (m',($\alpha$, v)) comprises steps of:

parsing $\alpha$ into $\alpha_m$, $\alpha_{sk}$ and $\alpha_v$;

forming a set of data points $(\alpha_m, m')$ and $(\alpha_v, v)$;

executing a decoding algorithm on the set of data points to obtain a polynomial $p(x)$ of degree less than $2(l_m+l_{sk})$; and computing and outputting $sk'=p(\alpha_{sk})$.

17. The computer program product as set forth in claim 13, wherein for a locking algorithm Lock(m, sk) receiving as input a biometric template $m \in F^{l_m}$ and $sk \in F^{l_{sk}}$, where $l_m$ denotes a locking key length, $l_{sk}$ denotes a secret random key to be locked, and $F$ is a finite field, Lock(m, sk) comprises steps of:

setting a vector of pairwise distinct x-coordinates $\alpha=\{\alpha_1, \alpha_2, \ldots, \alpha_{l_m+l_{sk}+v}\}$, where $\alpha$ is partitioned into three vectors denoted by $\alpha_m$, $\alpha_{sk}$, and $\alpha_v$, such that $\alpha_{sk}$ and $\alpha_v$ are preselected vectors, while $\alpha_m$ is computed as $\alpha_m=H_m$;

sampling a random polynomial $r(x) \in F[x]$ of degree $d_r=l_m+l_{sk}$;

computing a secret polynomial $p(x) \in F[x]$ of degree $d_p=2d_r$, such that $p(\alpha_m)=m$ and $p(\alpha_{sk})=sk$;

computing $v=p(\alpha_v)$; and outputting a reusable vault $V_{sk}^m=(\alpha_{sk}, \alpha_v, v)$.

18. The computer program product as set forth in claim 17, wherein for an unlocking algorithm Unlock($V_{sk}^m$, m') receiving as input a vault $V_{sk}^m=(\alpha_{sk}, \alpha_v, v)$ and a query template $m' \in F^{l_m}$, Unlock($V_{sk}^m$, m') comprises steps of:

computing $\alpha_{m'}=H(m')$;

forming a set of data points $(\alpha_{m'}, m')$ and $(\alpha_v, v)$, where Q denotes the set of data points;

executing a decoding algorithm on Q to obtain a polynomial $p(x)$ of degree $\leq d_p$; and computing and outputting $sk'=p(\alpha_{sk})$.

* * * * *